United States Patent
Manwaring et al.

(10) Patent No.: US 6,877,775 B2
(45) Date of Patent: Apr. 12, 2005

(54) ADAPTIVE ENERGY ABSORPTION SYSTEM

(75) Inventors: Marvin V. Manwaring, Clio, MI (US); Lee M. Tinnin, Clio, MI (US); Ravindra Jwalapathy, Saginaw, MI (US); Ray G. Armstrong, Bay City, MI (US); Richard K. Riefe, Saginaw, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/431,824

(22) Filed: May 8, 2003

(65) Prior Publication Data
US 2004/0004348 A1 Jan. 8, 2004

Related U.S. Application Data
(60) Provisional application No. 60/379,491, filed on May 9, 2002.

(51) Int. Cl.⁷ .................................................. B62D 1/19
(52) U.S. Cl. ......................................... 280/777; 74/493
(58) Field of Search .............................. 280/775, 777, 280/779; 74/492, 493

(56) References Cited

U.S. PATENT DOCUMENTS

| | | |
|---|---|---|
| 5,782,595 A | 7/1998 | Schneider |
| 5,797,175 A | 8/1998 | Schneider |
| 5,801,329 A | 9/1998 | Schmidt |
| 5,871,319 A | 2/1999 | Schneider |
| 6,042,313 A | 3/2000 | Dehlke |
| 6,044,536 A | 4/2000 | Schneider |
| 6,176,151 B1 | 1/2001 | Cymbal |
| 6,189,929 B1 | 2/2001 | Struble et al. |
| 6,309,156 B1 | 10/2001 | Schneider |
| 6,322,103 B1 | 11/2001 | Li et al. |
| 6,325,584 B1 | 12/2001 | Marko et al. |
| 6,450,532 B1 | 9/2002 | Ryne et al. |
| 6,454,302 B1 | 9/2002 | Li et al. |
| 6,575,497 B1 | 6/2003 | McCarthy et al. |
| 6,652,002 B2 * | 11/2003 | Li et al. ..................... 280/777 |
| 6,749,221 B2 * | 6/2004 | Li .............................. 280/777 |
| 6,749,222 B2 * | 6/2004 | Manwaring et al. ........ 280/777 |

FOREIGN PATENT DOCUMENTS
JP  05116635  5/1993

* cited by examiner

Primary Examiner—Eric Culbreth
(74) Attorney, Agent, or Firm—Michael D. Smith

(57) ABSTRACT

An energy absorbing assembly (20) providing variable energy absorption from an energy transmitting component (10) is mounted upon a mounting bracket (16) for mounting the energy absorbing assembly (20) to the energy transmitting component (10). An elongated strap (22) immovably secured at a first end (24) absorbs energy received from the energy transmitting component (10) during a collision. Cooperating anvils (30A,B) are slidably received by the mounting bracket (16) and the elongated strap (22) is interwoven between the anvils (30). The anvils (30A,B) include generally parallel axes (a) along which each anvil (30A, 30B) defines stepped diameters (A,B,C,D), and are slidable along the axes (a) in response to a predetermined force to provide variable energy absorption relative to the stepped diameters (A,B,C,D).

18 Claims, 4 Drawing Sheets

ADAPTIVE ENERGY ABSORPTION SYSTEM

REFERENCE TO RELATED APPLICATIONS

This patent application claims priority to U.S. Provisional Patent Application No. 60/379,491 filed on May 9, 2002.

TECHNICAL FIELD

This invention relates generally to an energy absorber for a motor vehicle steering column.

BACKGROUND OF THE INVENTION

Various vehicle components are known to transmit energy from collisions to vehicle occupants. A typical component is a steering column of a steering wheel that includes a housing or mask jacket that collapses during a vehicle collision. The mask jacket translates the collision energy through an energy absorber to convert the crash energy to a fraction of the kinetic energy transferred to the vehicle operator.

A common energy absorber transmits force created by a plastic deformation of a metal element or strap disposed in the energy absorber. An example is disclosed in U.S. Pat. No. 6,322,103 where deformation of a flat metal strap over an anvil is disclosed to absorb crash energy. It has been discovered that a benefit is derived by adjusting the amount of energy absorbed relative to the amount of energy that may be translated to the vehicle operator based on such variables as vehicle speed, vehicle weight, and operator weight. Also, U.S. Pat. No. 6,189,929 discloses an anvil having various diameters where the anvil is adjusted to position a desired diameter in contact with the metal strap to adjust the amount of energy absorption produced by the energy absorber.

While these devices are capable of producing various amounts of energy absorption, they have not provided a desirable degree of variable energy absorption. Further, these devices are known to provide an imprecise amount of energy absorption relative to the desired amount of energy absorption due to mechanical failures such as, for example "bounce back" where the anvil is initially moved to a desirable position but rebounds back to an initial position. Therefore, it would be desirable to provide an energy absorber having both an increased degree of variable energy absorption along with a more accurate degree of energy absorption.

SUMMARY OF THE INVENTION

The present invention relates to an improved energy absorbing device that provides variable energy absorption transmitted from an energy transmitting component of a motor vehicle. A mounting bracket mounts the energy absorbing device to the energy transmitting component. An elongated strap is secured at at least one end for absorbing energy received from the energy transmitting component. Cooperating anvils are slidably received by the mounting bracket and are oriented so that the elongated strap is interwoven between the anvils. The anvils include a generally parallel axis along which each anvil defines stepped diameters. Each anvil is slideable along its axis in response to a predetermined force to provide variable energy absorption relative to the stepped diameters of each anvil.

Further, a catch is included to secure each anvil in a desired position to prevent the anvil from moving once the desired amount of energy absorption is determined and the anvil has been positioned to produce the desired amount of energy absorption.

By including cooperating anvils each slideable relative to the other, a more precise variation in the amount of energy absorption is provided. Further, by providing a catch to secure the anvil in its desired position once the anvil has been moved to provide a desired amount of energy absorption, mechanical failures known to prior art assemblies have been eliminated.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
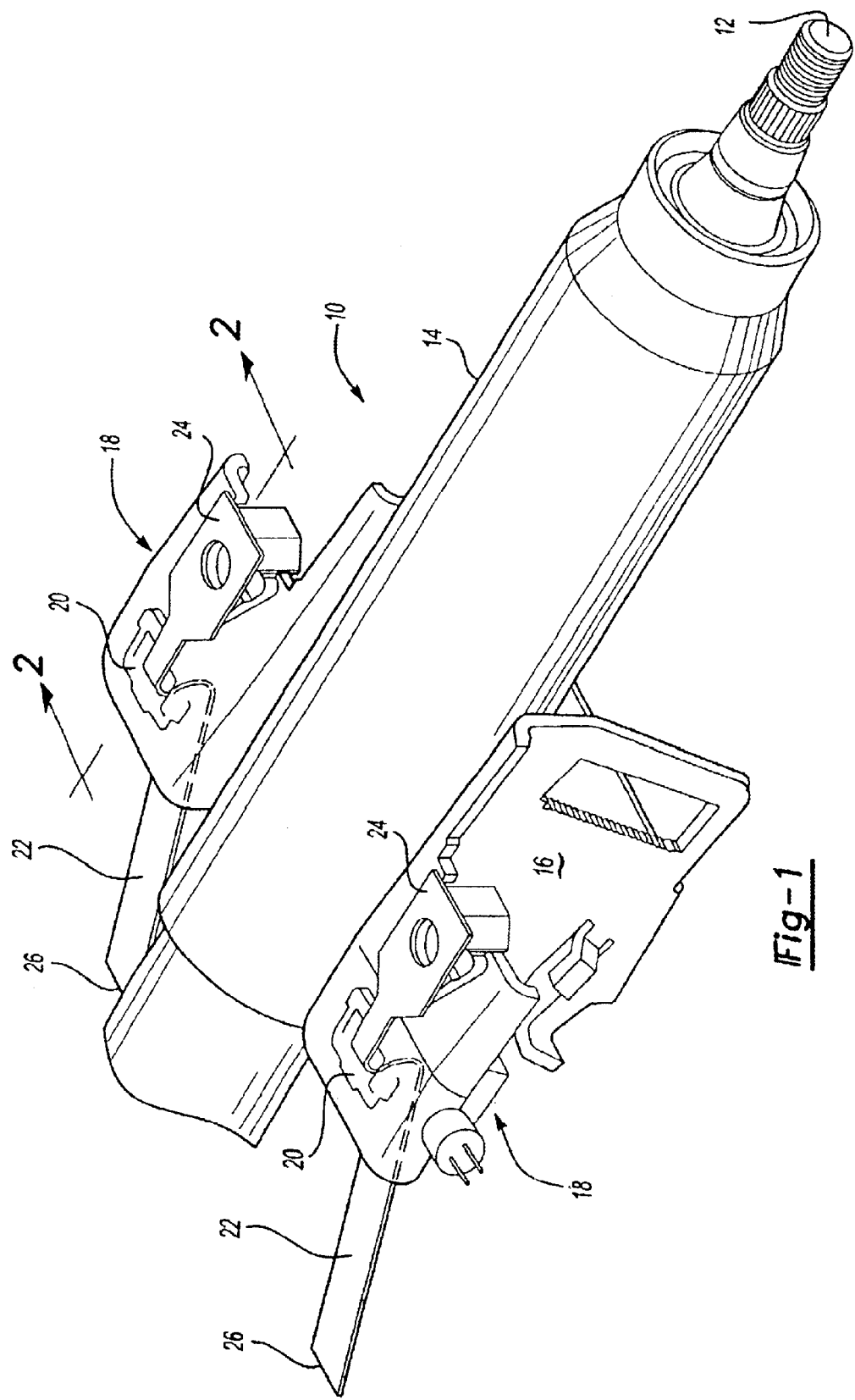
FIG. 1 is a perspective view of a steering column having the inventive energy absorbing assembly attached thereto.

Referring to FIG. 1, an energy transmitting component in the form of a steering column is generally shown at 10. The column includes a steering shaft 12 that is disposed within a steering housing 14. A mounting bracket (16) is fixedly attached to the steering housing 14 providing attachment locations 18 disposed upon opposing sides of the steering column 10. An energy absorbing assembly 20 is secured at each attachment location 18 to absorb energy received from the steering column 14 upon a collision of the motor vehicle.

In a collision of the motor vehicle (not shown), the vehicle body decelerates more rapidly than the operator so that the operator can be thrust against the steering wheel (not shown) generating an impact force relative to the speed of the vehicle, mass of the vehicle and mass of the vehicle operator amongst other variables. When the operator impacts the steering wheel, the corresponding force on the steering column housing 14 causes the housing 14 to collapse relative to the vehicle body. In order to reduce the amount of impact force transmitted to the vehicle operator, the energy absorbing assemblies 20 absorb energy generated from the vehicle operator impacting the steering column 10.

A flat metal strap 22 includes a first end 24 fixedly attached to the mounting bracket (16). A second end 26 is unattached, or floats freely relative to the assembly 20.

Figure 2:
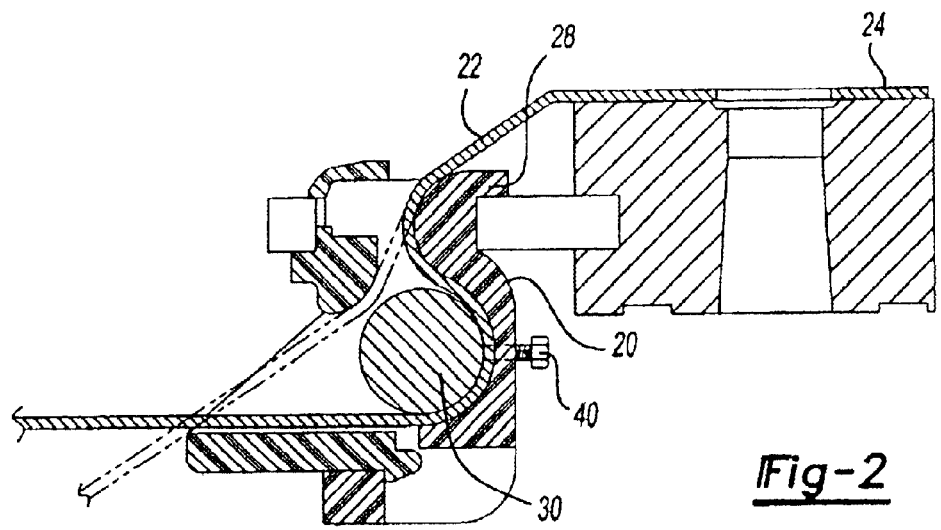
FIG. 2 is a sectional view of the energy absorbing assembly showing a single anvil configuration cooperable with an elongated strap.

Referring to FIG. 2, the strap 22 is shown interwoven through the assembly 20 forming a generally S-shaped configuration between a protuberance 28 in the assembly 20 and an anvil 30. The anvil 30 is displaceable as will be explained further below to alter the amount of energy absorption produced by the strap 22 as is shown in phantom in FIG. 2.

Figure 3:
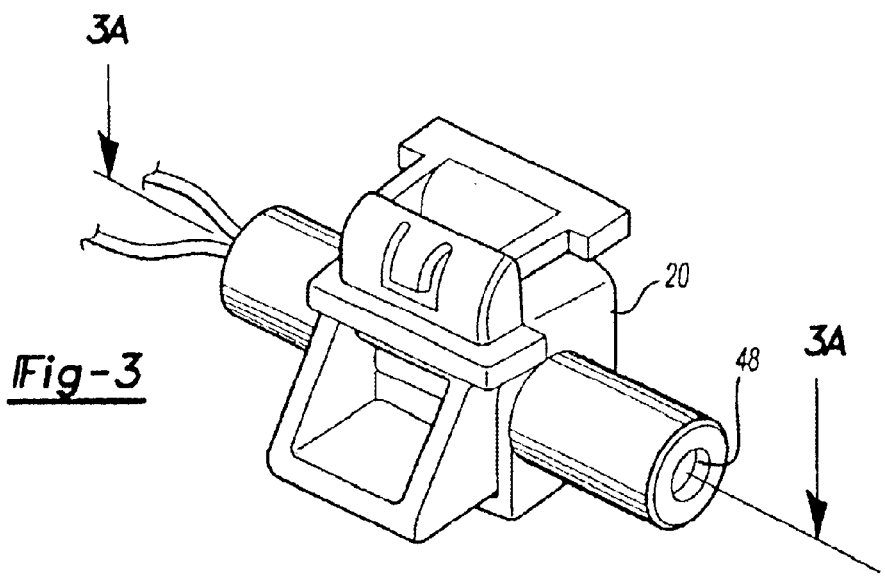
FIG. 3 shows a perspective view of an assembly having a single anvil.
Figure 3A:
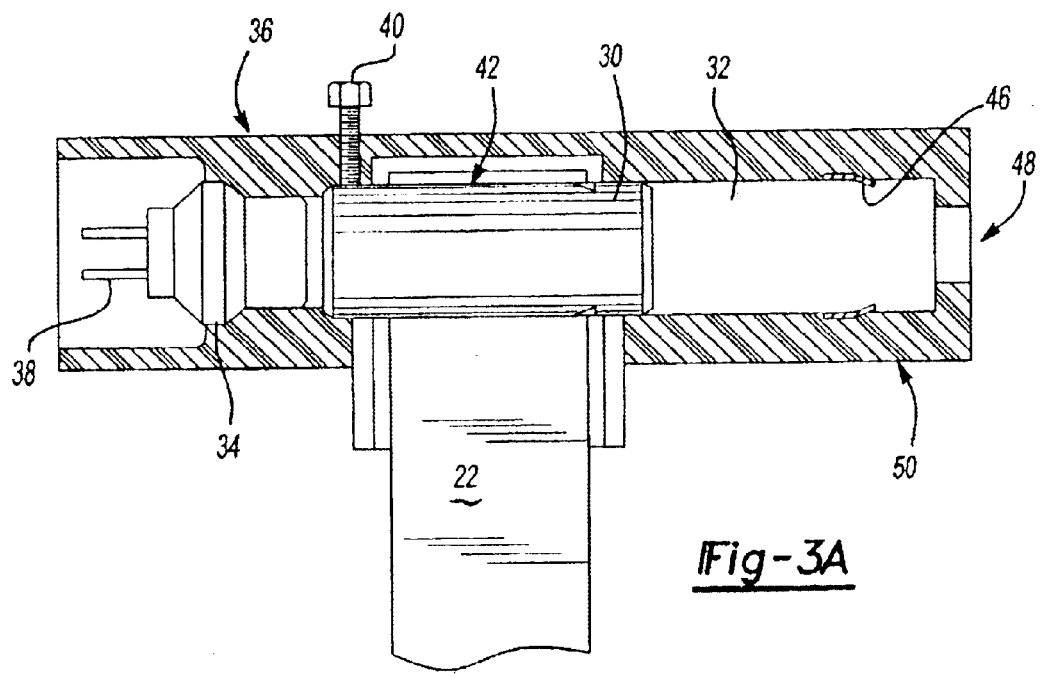
FIGS. 3A and 3B show a sectional view of the anvil of FIG. 3 prior to firing and subsequent to firing.
Figure 3B:
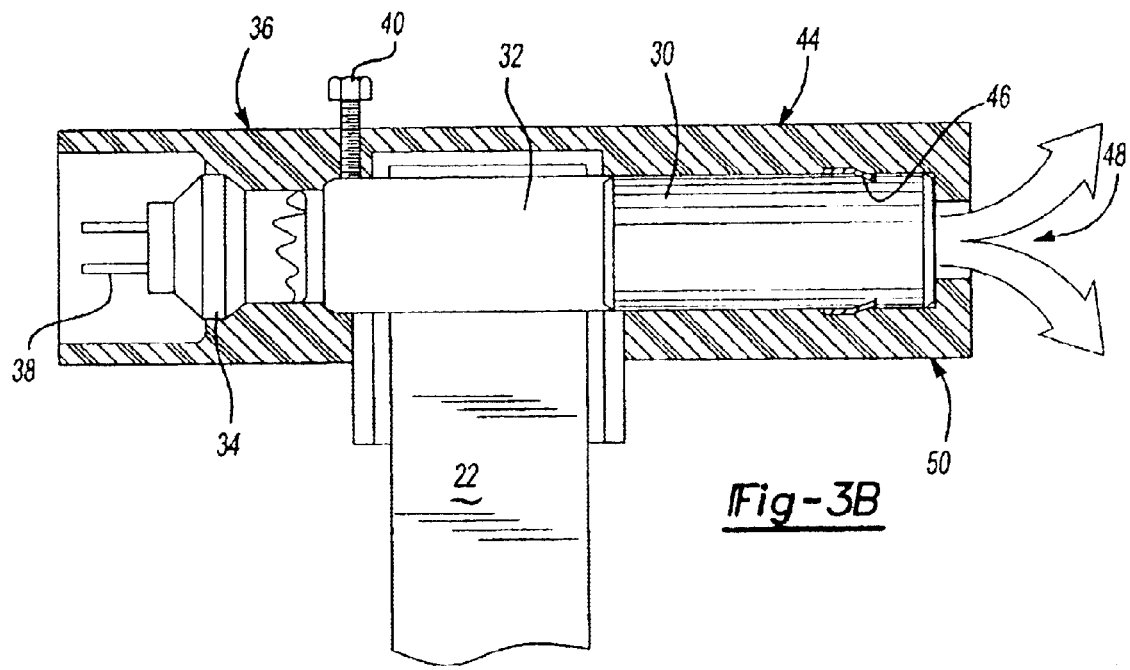

Referring now to FIGS. 3, 3A and 3B, the anvil 30 is shown slidably disposed within an elongated chamber 32 defined by the assembly 20. An actuation device 34 is disposed at a first end 36 of the elongated chamber 32. Preferably, the actuation device 34 is an explosive charge.

However, other equivalent methods of propelling the anvil 30 through the elongated chamber 32 may be used. The actuation device 34 includes electrical connectors 38 that receive an electrical charge signalled from a controller (not shown) to activate the actuation device 34.

A retaining pin 40 releasably secures the anvil 30 in a first position 42 (FIG. 3A). Upon discharging, the anvil 30 is moved from the first position 42 to a second anvil position 44 (FIG. 3B). A catch 46 secures the anvil 30 in the second position 44 to prevent the anvil 30 from rebounding back to the first position 42. An opening 48 disposed in a second chamber end 50 allows air to vent from the chamber 32 enabling the anvil 30 to move from the first position 42 to the second position 44. When the anvil 30 is located in the first position 42, a greater level of energy absorption is provided than when the anvil 30 has been moved to the second position 44 and out of engagement with the strap 22.

Figure 4:
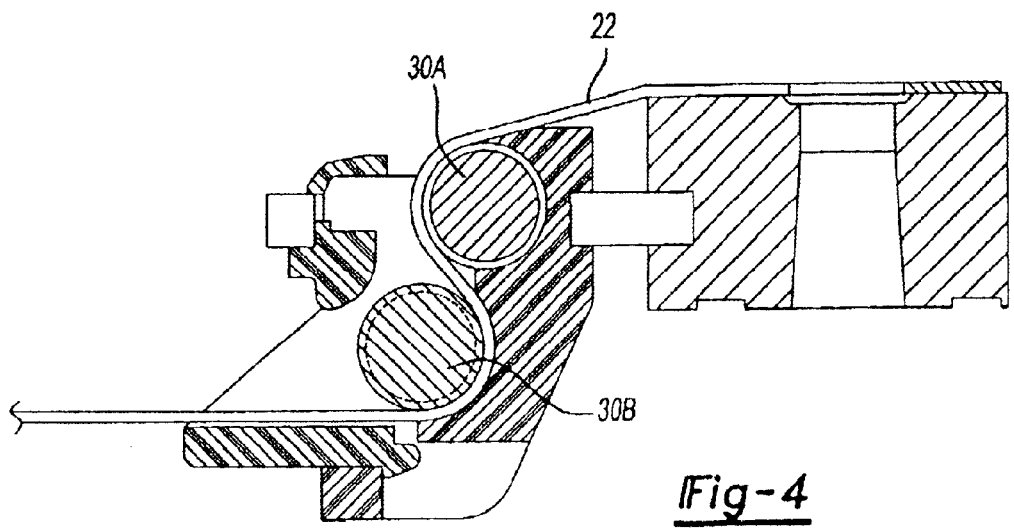
FIG. 4 shows a side sectional view of a cooperable anvil embodiment having the strap interwoven therebetween.

Referring to FIGS. 4, and 5A through 5D, an alternate embodiment is shown having cooperating anvils 30A, 30B. Each anvil 30A, 30B includes stepped diameters along an anvil axis a so that each anvil 30A, 30B includes at least two sections having different diameters as is best represented in FIG. 5A through D as A, B, C, D. Preferably, the anvils 30A, 30B include generally parallel axes a and are slidably disposed in generally parallel elongated chambers 32A, 32B. Referring now to FIG. 4, a sectional view shows the cooperating anvils 30A, 30B having generally parallel axes. The strip 22 is interwoven between the cooperating anvils 30A, 30B taking a generally S-shaped configuration.

Figure 5A:
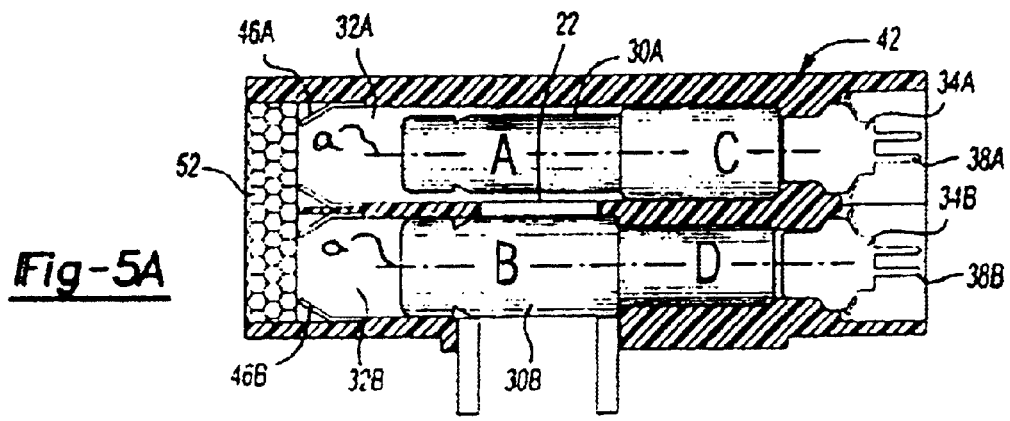
FIGS. 5A–5D show cooperable anvils having stepped diameters in various stages of orientation.
Figure 5B:
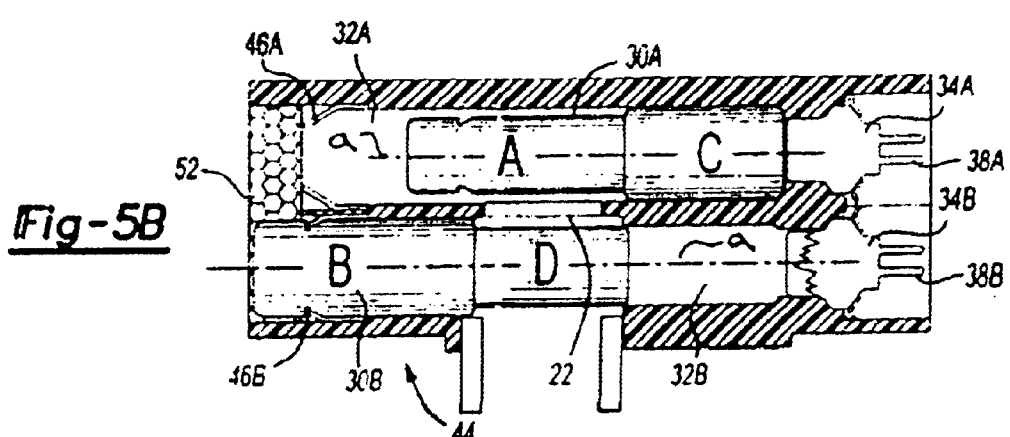

Referring again to FIG. 5A, each anvil 30A, 30B is disposed in first position 42. Therefore, a first diameter A of the first anvil 30A is cooperable with a first diameter B of the second anvil 30B. As should be understood, if the controller determines the appropriate amount of energy absorption is provided from the strap 22 interacting with diameters A and B of the anvils 30A, 30B the actuation devices 34A, 34B are not discharged. Therefore, the energy absorption is derived from the anvils 30A, 30B as provided by diameters A and B. Referring now to FIG. 5B, the second actuation device 34B is discharged by the controller to provide a second level of energy absorption different from the first level. In this case, diameter A of the first anvil 30A is cooperable with the diameter D of the second anvil 30B. A receptor 52 comprising a compressible material such as, for example, a honeycomb material, optionally receives the second anvil 30B, when propelled by the actuation device 34B, through the elongated chamber 32B, A catch 46B secures the anvil 30B in the discharged position to prevent the anvil 30B from rebounding once the actuation device 34A has fired.

Figure 5C:
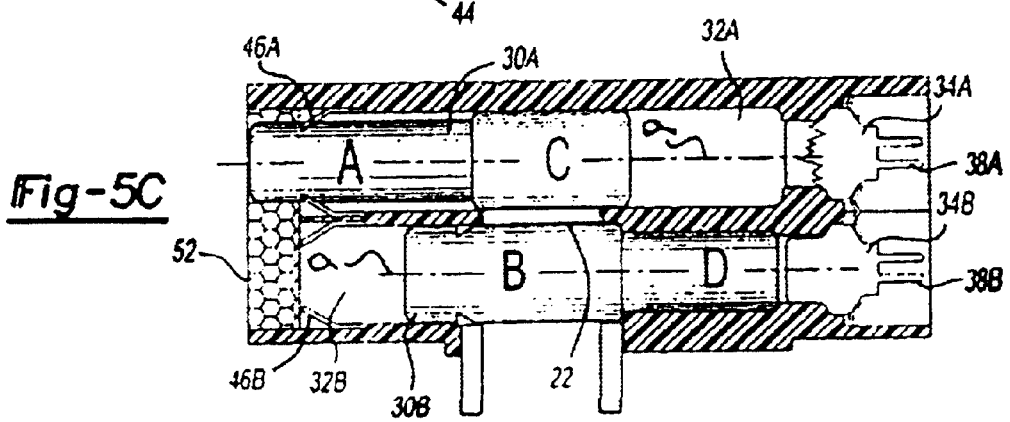

Referring now to FIG. 5C, actuation device 34A is shown discharged moving anvil 30A to a discharged position. Now, diameter C of anvil 30A is cooperable with diameter B of anvil 30B providing yet an additional level of energy absorption. As previously described, anvil 30A is received by a receptor 52 and secured in the discharged position by catch 46A.

Figure 5D:
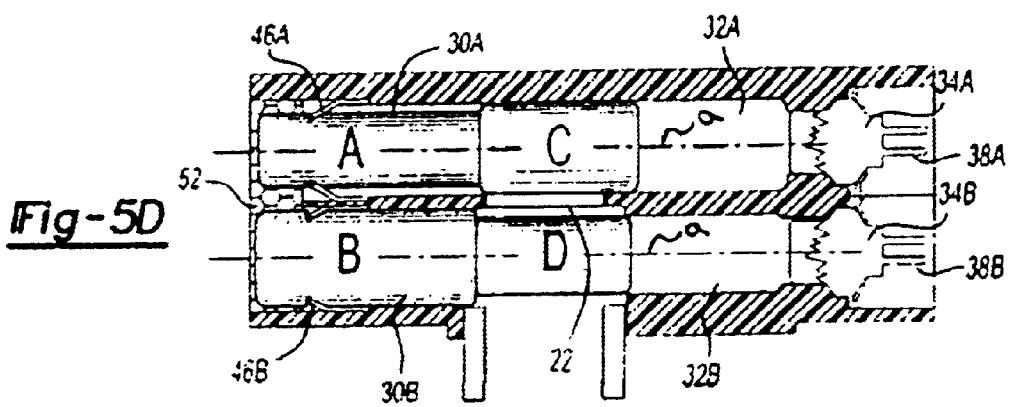

Referring now to FIG. 5D, actuation devices 34A and 34B are shown discharged so that diameter C of anvil 30A and diameter D of anvil 30B are cooperable. This provides still another level of energy absorption. In this case, both anvils 30A and 30B are received by the receptor 52 and secured in the discharged position by catches 46A and 46B. It should be understood that while two cooperating anvils 30A, 30B are shown, more than two anvils may be used to achieve even a further level of energy absorption. Further, providing anvils 30A, 30B with more than two stepped diameters such as, for example, three stepped diameters achieves still further levels of energy absorption.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An energy absorbing assembly (20) providing variable energy absorption from an energy transmitting component (10), comprising:

a mounting bracket (16) for mounting said energy absorbing assembly (20) to the energy transmitting component (10);

an elongated strap (22) immovably secured at a first end (24) for absorbing energy received from the energy transmitting component (10);

cooperating anvils (30A,B) slidably received by said mounting bracket (16), wherein said elongated strap (22) is interwoven between said anvils (30); and wherein said anvils (30A,B) include generally parallel axes (a) along which each anvil (30A, 30B) defines stepped diameters (A,B,C,D), and is slidable along one of said axes in response to a predetermined force thereby providing variable energy absorption relative to said stepped diameters (A,B,C,D).

2. An assembly (20) as set forth in claim 1, wherein said cooperating anvils (30A, 30B) comprise first (30A) and second anvils (30B).

3. An assembly (20) as set forth in claim 2, wherein said first and second anvils (30A, 30B) each include at least two segments (A,B,C,D) arranged along said axis (a), each segment having a different diameter.

4. An assembly (20) as set forth in claim 3, wherein said first anvil (30A) is slidable relative to said second anvil (30B) thereby providing at least four levels of energy absorption.

5. An assembly (20) as set forth in claim 1, wherein said first and second anvil (30A, 30B) are each slidably disposed within a chamber (32A, 32B) elongated to receive said first and second anvil (30A, 30B).

6. An assembly (20) as set forth in claim 5, including an actuation device axially aligned at one end of each said anvil (30A, 30B) for providing propelling force to each of said anvils (30A, 30B) for moving said anvils from a first position (36) to a second position (46).

7. An assembly (20) as set forth in claim 6, wherein said actuation device (34) comprises an explosive charge.

8. An assembly as set forth in claim 7, wherein each of said chambers (32A, 32B) includes a catch (46A, 46B) for securing said anvil (30A, 30B) in said second position (46).

9. An assembly (20) as set forth in claim 6, wherein said chamber includes an opening in an end opposite from said actuation device for providing venting to said chamber.

10. An assembly (20) as set forth in claim 6, wherein said chamber (32A, 32B) includes a receptor (52) compressible to receive said first and said second anvil (30A, 30B).

11. An assembly as set forth in claim 10, wherein said receptor (52) comprises a material having a honeycombed configuration.

12. An assembly as set forth in claim 1, comprising an actuation device (34) axially aligned at one end of said anvils (30A,B) providing propelling force to said anvil (30A,B) thereby moving said anvil 30A,B a first position (42) to a second position (44).

13. An assembly as set forth in claim 12, wherein said actuation device (34) comprises an explosive charge.

14. An energy absorbing assembly (20) providing variable energy absorption from an energy transmitting component (10), comprising:
   a mounting bracket (16) for mounting said energy absorbing assembly (20) to the energy transmitting component (10);
   an elongated strap (22) cooperable with said energy absorbing assembly for absorbing energy received from the energy transmitting component (10); and
   an anvil (30) having a variable diameter and being slidable between at least first and second positions (42,46) relative to said strap (22) for introducing different diameters of said anvil (30) into engagement with said strap (22) thereby providing variable energy absorption relative to an interaction between said anvil (30) and said strap (22), wherein said anvil (30) is engagable with a catch (46) thereby securing said anvil (30) in said second position (44).

15. An assembly as set forth in claim 14, wherein said catch (46) comprises a spring clip.

16. An assembly as set forth in claim 15, wherein said anvil (30) includes a notch (47) engagable with said catch thereby securing said anvil (30) in said second position (44).

17. An assembly as set forth in claim 14, wherein said assembly (20) includes a receptor (52) comprising a material compressible to receive said anvil (30).

18. An assembly as set forth in claim 17, wherein said receptor (52) comprises a material having a honeycombed configuration.

\* \* \* \* \*